United States Patent [19]
Benest

[11] Patent Number: 5,507,435
[45] Date of Patent: Apr. 16, 1996

[54] METHOD AND APPARATUS FOR CROP SPRAYING INCLUDING AN ARTICULATED BOOM SPRAYER

[75] Inventor: Roger S. Benest, St. Lawrence, Channel Islands

[73] Assignee: Benest Engineering Limited, Jersey, Channel Islands

[21] Appl. No.: 190,170

[22] PCT Filed: Jul. 23, 1994

[86] PCT No.: PCT/GB92/01356

§ 371 Date: Jul. 8, 1994

§ 102(e) Date: Jul. 8, 1994

[87] PCT Pub. No.: WO93/02552

PCT Pub. Date: Feb. 18, 1993

[30] Foreign Application Priority Data

| Aug. 6, 1991 | [GB] | United Kingdom | 9117101 |
| Sep. 28, 1991 | [GB] | United Kingdom | 9120681 |
| Mar. 12, 1992 | [GB] | United Kingdom | 9210208 |

[51] Int. Cl.$^6$ .................................... B05B 1/20
[52] U.S. Cl. ............................ 239/1; 239/167; 239/73
[58] Field of Search .................. 239/164, 71, 167, 239/73, 170, 1, 166

[56] References Cited

U.S. PATENT DOCUMENTS

| 1,348,038 | 7/1920 | Neumeyer. | |
| 1,526,642 | 2/1925 | Nissley. | |
| 1,906,033 | 4/1993 | Phalen. | |
| 2,301,213 | 11/1942 | Kang. | |
| 2,645,523 | 7/1953 | Long | 239/167 |
| 3,143,295 | 8/1964 | Booker. | |
| 3,565,340 | 2/1971 | Meyer. | |
| 3,731,879 | 5/1973 | Dijkof | 239/167 |
| 3,785,564 | 1/1974 | Baldocchi. | |
| 4,206,569 | 6/1980 | Randolph | 239/170 X |
| 4,588,128 | 5/1986 | Broyhill et al.. | |
| 5,326,030 | 7/1994 | Benest | 239/167 |
| 5,348,226 | 9/1994 | Heiniger et al. | 239/164 |

FOREIGN PATENT DOCUMENTS

| 930769 | 2/1971 | Canada | 239/167 |
| 1185216 | 4/1985 | Canada. | |
| 0176084 | 9/1985 | European Pat. Off.. | |
| 2409003 | 11/1977 | France. | |
| 2560533 | 9/1985 | France. | |
| 2563970 | 11/1985 | France. | |
| 1181485 | 11/1964 | Germany. | |
| 3512992 | 10/1986 | Germany. | |
| 224380 | 4/1943 | Switzerland. | |
| 229146 | 12/1947 | Switzerland. | |
| 615898 | 7/1978 | U.S.S.R. | 239/167 |
| 957800 | 9/1982 | U.S.S.R. | 239/167 |
| 635424 | 4/1950 | United Kingdom. | |
| 1574308 | 9/1980 | United Kingdom. | |
| 8701909 | 4/1987 | WIPO. | |

Primary Examiner—Kevin P. Weldon
Attorney, Agent, or Firm—Brooks & Kushman

[57] ABSTRACT

A dropleg row crop sprayer senses boom height and tilt from ground-contacting droplegs signalling through potentiometers to a boom control mechanism. The droplegs follow crop row wandering through a driven carriage. Dropleg attitude is assisted by a cam control system. The boom also has a passive suspension system including damped frictional abutment of boom portions. A signal actuator controls boom attitude. The spray direction is fore/aft of the row.

12 Claims, 6 Drawing Sheets

METHOD AND APPARATUS FOR CROP SPRAYING INCLUDING AN ARTICULATED BOOM SPRAYER

TECHNICAL FIELD

This invention relates to a method and apparatus for crop spraying utilizing an articulated boom-type sparaying apparatus.

BACKGROUND OF THE INVENTION

The present application discloses improvements and modifications of the method and apparatus for crop spraying disclosed in prior International publication number WO92/00670 published on 23 Jan. 1992.

It is convenient to summarise here some of the more important aspects of the disclosure in WO92/00670 as follows:

SPRAY CONTROL

1 Sprays are directed upwardly or horizontally from droplegs;

2 The droplegs fold for transport.

3 Combined upwardly and downwardly directed sprays.

4 Droplegs provided as the spokes of rotary rimless wheels to penetrate lodged crops;

5 Air flow control to control movement of the discharged spray.

ROW FOLLOWING

The droplegs are mounted for lateral floating movement on carriages.

BOOM HEIGHT AND TILT SENSING

There is mentioned on page 5 of the description the control of boom height and tilt by sensors on the boom which contact the soil surface and operate electrical actuators to level the boom.

TRANSPORT

1 The boom folds in a Z-fashion.

2 The dropleg carriages are controlled on folding of the booms.

The present application seeks to provide improvements in relation to several of the above-mentioned aspects of the disclosure in WO92/00670, as follows.

For purposes of disclosure I hereby incorporate the entire description and drawings of WO92/00670 into the present application as part of the disclosure thereof.

SUMMARY OF THE PRESENT INVENTION

BOOM HEIGHT AND TILT SENSING

Investigations have shown that an effective system for boom height and tilt control is needed. It is not sufficient to base boom height and tilt control on tractor attitude. One reason for this is that tractor attitude can change almost instantaneously during field operations when, for example, a tractor wheel drops into a rut. Third party prior proposals for boom height and tilt sensing based on non-contact systems such as radar, infra-red or ultrasonic height sensing have proved ineffective due to the variability of the operating conditions caused by the presence of growing crop between the sensor and the ground. In short, it has proved impossible to develop effective height sensing based on such non-contact systems.

Equally however, ground contact sensors as proposed in a general way in WO92/00670 are in practice difficult to implement, particularly with certain row crops such as potatoes, where it is difficult to see where such a ground contact sensor could be located without becoming entangled in the crop (when the crop has grown beyond a certain stage), or without interfering with the function of the spraying droplegs as disclosed in WO92/00670.

According to this aspect of the present invention there is provided a method and apparatus for crop spraying as defined in the relevant ones of the claims hereof (relating to boom height and tilt sensing).

In a preferred embodiment, a method and apparatus for crop spraying provides droplegs, generally as disclosed in WO92/00670. Some of the droplegs are employed for spraying purposes, generally as there disclosed. One or more of these droplegs or of an additional but similar dropleg is employed for boom height and/or tilt sensing purposes. Sensing means is associated with the mounting of the relevant one or ones of these sensing droplegs, whereby signals are generated to enable a control system to control the boom height and attitude. An example of such a sensor is a potentiometer.

By using the actual spraying droplegs, or a similar one or ones, there is provided a means of ground-contact height sensing which directly and reliably determines the height of the boom at the location of the dropleg, thereby eliminating the uncertainties of non-contact height sensing systems, and which takes advantage of the crop-penetration systems disclosed in WO92/00670 so that the ground-contact sensor is able to operate reliably and effectively.

By using an actual crop spraying dropleg, this second function of height sensing is conveniently and economically provided without in any way interfering with the crop spraying function of the dropleg.

If, for any reason, it were preferred not to employ a dropleg for both the spraying and height sensing functions, then this can be readily achieved by providing an additional dropleg at either or both of the outer opposite ends of the boom, to perform the height sensing function.

It will be understood that tilt sensing necessarily involves the use of two spaced height sensors at different locations on the boom, and a comparison of their height signals to determine tilt.

CAM CONTROL OF DROPLEG ATTITUDE

The preferred embodiment also provides cam means for controlling the dropleg attitude. Interengaging cam elements cooperate to preferentially hold the droplegs in a central position in which each dropleg is generally at right angles with respect to the longitudinal axis of the boom. In this position each dropleg senses the height of the boom from the ground directly below it, as measured at 90 degrees to the boom lengthwise axis. This feature is of value in hill-side spraying. If the dropleg were allowed to adopt a vertical attitude in such operates this would adversely affect the height-sensing which the dropleg provides, whereby inconsistencies in boom height control would be produced. This fact arises at least in part from the fact that crops of the kind with which the present invention is concerned, such as potatoes, tend to have a measurable crop maximum height derived from growth generally at right angles to the surface of the land, rather than in a purely vertical direction.

The arrangement of cam elements is such that the dropleg can adopt a folded configuration when the boom is itself in its transport position, and the above-mentioned working position during use. This can be achieved automatically as a result of the turning moment derived from the weight of the dropleg acting on the cam elements. For this purpose spring engagement of the cam elements is chosen so as to act with a force permitting the weight-derived turning moment generated when the boom folds to be sufficient to permit the dropleg to pivot. The cam assembly may be provided with cam elements which define also (and tend to retain) a transport position of the dropleg.

The cam means used for dropleg attitude control are spring-biased. The cams may be provided by smoothly-undulating pairs of wavy washers which are spring-biased into engagement and disposed coaxially with respect to the axis of dropleg pivotal movement.

DROPLEG BREAKBACK

The droplegs used for spraying and/or height and tilt sensing purposes may have a generally trailing attitude with respect to the ground, when travelling in the normal forward direction of travel during spraying operations. Such a trailing attitude is however not essential for the purposes of the proper operation of the droplegs, as can be seen from FIG. 3 of the drawings hereof. However, a trailing attitude is preferred, and it has been found that such an attitude tends to cause particular problems with respect to entanglement of the droplegs with the crop, and otherwise, in the event that the boom and its droplegs are driven in the reverse direction by the tractor operator, for any reason.

Accordingly, there is a need for the provision of means to reduce this problem and according to the invention there is provided a method and apparatus as defined in those of the accompanying claims identified under the sub-heading "dropleg breakback". It is to be understood that this aspect of the invention is applicable to droplegs regardless of whether they perform a spraying or spreading or height or tilt sensing function, or only one of these.

By providing a breakback facility in the dropleg structure, the risk of damage to the droplegs in the event of accidental or otherwise reverse travel of the spraying apparatus is substantially reduced or eliminated in a very simple manner. By providing for automatic spring-return of the droplegs to their working position, this facility is complemented by, effectively, an automatic re-setting function.

BOOM FLOAT AND DAMPING

Priority for this aspect of the invention is claimed from GB 9120681.3 dated 28 Sep. 1991. (P51724GB).

In WO92/00670 there is not disclosed any matter of particular relevance to this aspect of the present invention.

Prior proposals in relation to boom control have been found in actual field test conditions to fail to provide a sufficient degree of control of whip of the boom ie control of vertical movements, which change the effective ground height of the boom.

One problem in this regard relates to production tolerances in boom components. In actual practice, problems arise during use of large booms as a result of relatively rapid tractor movements arising from, for example, local irregularities in the terrain traversed eg the slipping of one or more tractor wheels into a deep rut. Such a particularly localised factor has little if any relevance to the boom height as a whole, but can generate large snatch loads on the linkage connecting the tractor to the boom.

More generally speaking, there is a need for a boom control system whereby once the boom height and attitude have been correctly chosen and set, the maintenance of the height and attitude is provided in an effective manner and without being unacceptably affected by intermittent tractor movements.

According to the invention there is provided a method and apparatus for crop spraying as defined in the relevant ones of the accompanying claims (identified under the heading "boom float and damping".).

In a preferred embodiment, a boom or boom portion is pivotally mounted on the tractor and is connected to a control mechanism including an actuator. In the embodiment, this control actuator is an electrical actuator, but hydraulic or pneumatic or other equivalents could be employed.

In a preferred embodiment, the control mechanism is connected to the boom through spring means whereby the boom can float or move up and down with respect to the control mechanism. The accommodation of such relative movement is provided by spring means, and the boom control forces (which need to be transmitted to the boom by the boom control mechanism) are transmitted to the boom from the control mechanism through the spring means. In other words, the spring means enables the boom to float relative to its control mechanism. As a result, the control mechanism, which necessarily may execute rapid movements due to bumpy terrain over which the tractor is passing, are not transmitted to the boom, and the latter maintains a generally constant attitude largely unaffected by instantaneous tractor attitude movements. This is of great benefit to the maintenance of the correct boom height and attitude with respect to the ground.

In the preferred embodiment, the spring means comprises opposed springs acting in opposite directions, and control forces are applied between the springs. The load on the springs is adjustable to vary their characteristics. Damping means may be provided acting on the boom to damp its movement and thus further enhance its ability to resist any tendency to react to instantaneous tractor movements.

FRICTION DAMPING

It will be understood from the foregoing that in boom-type agricultural and horticultural implements there is a need to damp boom movements, this need arising, inter alia, from the ever increasing size of spraying booms, and from the inevitably unpredictable and rapid tractor movements arising during spraying operations, due to irregularities of the terrain.

While conventionally-available damping systems can be employed, these have limitations in terms of their cost and operational characteristics, and there is a need for a damping system more specifically adapted to the particular needs of boom control systems, and which can be integrated into such systems in a more direct way.

With regard to this latter factor, the following needs to be considered. During spraying operations in addition to a need for the boom to be able to, generally speaking, maintain its attitude with respect to the ground, without being unduly affected by tractor attitude changes, nevertheless when ground contours change, there is a need for the boom control system to react accordingly, and to change boom tilt and/or height. For this latter purpose, obviously, some form of actuator is needed, but where a boom is formed in two or more portions for transport, the need can arise for corresponding numbers of actuators with corresponding duplication of cost.

Thus, there is a need for some means whereby boom tilt can be effected without the need to duplicate the actuators in the sense of providing one actuator per boom section.

According to this aspect of the present invention there is provided a method and apparatus as defined in the accompanying claims under the heading "friction damping".

In a preferred embodiment, an agricultural or horticultural boom-type implement has two boom portions with pivot means permitting up and down movement of the boom portions and abutment means at the inner ends of the boom portions whereby they can make direct abutting engagement. The location of the abutment means is such that the up and down movement of one of the boom portions about its pivot causes the transmission of corresponding movement through the abutment means to the other boom portion.

This arrangement produces significant frictional energy losses at the abutment means, and this causes a corresponding damping of the transmitted motion, thus leading to a significant reduction of the boom portions' tendency to oscillate when vertically-directed forces act on them.

In the preferred embodiment, the boom pivots are at a raised location with respect to the abutment means, and are offset laterally outwardly thereof. The pivot means may comprise the main boom hinges, these having their hinge axes extending generally in the fore-aft direction.

By virtue of the cooperation of the boom portions, a single actuator is provided to act directly on one boom portion to tilt same, and this action tilts also the other boom portion by virtue of the transmitted motion.

LOST MOTION LIFT LINKAGE

Another consequence of the above-mentioned tendency during use of boom type implements for a tractor carrying the boom to execute relatively rapid movements, while the boom itself stays relatively stationary (in terms of tilting movement with respect to the normal forward direction of motion of the implements), is the generation of large snatch loads on the lift and/or control linkage, when such relative movement occurs.

The provision of the above-mentioned spring cushioning system enables the boom to, effectively, float freely while being under the attitude control of the actuator. Nevertheless, there is a need to provide additional protection for the lift and/or control systems arising from such snatch loads, and an object of the present invention is to provide improvements in this respect, or generally.

According to the invention there is provided a method and apparatus as defined in those of the accompanying claims identified under the sub-heading "lost motion lift linkage".

In a preferred embodiment, the provision of lost motion means in the connection between the lift mechanism and the boom enables the lift mechanism to lift the boom after the lost motion has been taken up, but in normal operation the lift mechanism can act on the boom to control same. For example, such control can be exercised through the spring system disclosed above under the heading "boom float and damping".

In the preferred embodiment, the lost motion is defined by movement between a pivoted lever having an abutment engageable with a fixed pillar. On such abutment occurring, the lift mechanism is then able to lift the boom directly and positively.

In operation, the arrangement is such that the lift mechanism has two ranges of movement, namely a lift range and a control range. When the implement is lowered for operation, the lift mechanism automatically moves beyond its lift range to its control range in which it can exert attitude or height control on the boom.

SPRAY CONTROL

Systems for the use of, effectively, micro droplets of spray were first proposed a decade or more ago, and were at that time thought to hold great promise for more effective spraying in view of the inherent advantages in such a system. These advantages included the possibility of electrostatically charging the microdroplets so that they would be attracted to the plants or crop to be sprayed. Likewise, the low volumes of liquid used lead to advantages in terms of bulk and weight of the equipment when in use and significantly reduced time spent in replenishing the tank of liquid to be sprayed.

However, microdroplet spraying has not been a significant commercial success and apparently the main reason for this has been the actual difficulty in controlling the microdroplets after they have left the equipment, due to the effect of air currents and the like. The technique is currently used in a commercial sense only in relatively small scale operations employing hand held spraying lances where the effect of wind and air currents can be controlled by the user.

An object of this aspect of the present invention is to provide a means whereby the above-mentioned and possibly other advantages of microdroplets spraying, or at least one or more of them, can be secured for tractor-type spraying operations.

According to the invention there is provided a method and apparatus for crop spraying as defined in the relevant ones (under the sub-heading "spray control") of the accompanying claims.

In a preferred embodiment, microdroplets are dispensed from droplegs at a level in relation to a crop to be sprayed so that the crop itself serves to shield the microdroplets from the effect of wind or air currents or turbulence. The degree of protection afforded by the crop in this way will obviously be determined by the extent of growth of the crop, but in the situation where spraying is most vital ie where the crop has reached a significant proportion of its maximum growth height, the degree of protection provided by the crop will itself be sufficient to enable the clouds of microdroplets to be effective in their coverage of the underside of the crop.

In this way, the originally-expected advantages of microdroplet spraying are combined in a tractor-type field spraying operation with the advantages already setforth in WO92/00670 which are produced by spraying not from above, but from within or below a crop in a horizontal or upward direction.

In one embodiment, the microdroplets are electrostatically charged in order to enhance the effectiveness with which the droplets transfer to the adjacent crop or plant surfaces.

The size of droplets produced is preferably between the maximum and minimum size limits producible by a rotary droplet generator, whereby the droplets are not so small as to be difficult to control, and not sufficiently larger than this as to have a tendency to bounce off crop surfaces. Air flow generating means may be provided to energise the droplets produced by the spray dispenser, and thus to assist movement of droplets to the crop material.

In the preferred embodiment, the microdroplets are generated by a spinning cone which has fine grooves radiating from the apex of the cone. Liquid to be sprayed is released into these grooves and transported by centrifugal force to the edge of the cone where it is released as a fine spray. The droplet size produced is such that the droplets are rapidly slowed by the air itself. Below the canopy of the crop the droplets are able to freely float to the nearest crop leaf or stem.

In the preferred embodiment, there are provided two or more droplet generators on each dropleg. The generators are electrically driven. By the use of multiple droplet generators, the need for a relatively large rotary droplet generator is avoided. The droplets thus produced are energised by the rotary discs. A fan may be provided to propel the droplets from the droplet generating rotors. The air from the fan propels the droplets rather than generating an air flow which carries them. The droplet generating rotors may be mounted in a tube of diameter, for example, about 31 millimetres.

The economy of the apparatus in terms of use of spray liquid may be such that only 20 litres of spray liquid is needed per acre as compared with 100 gallons used with conventional spraying apparatus. In view of the down-time involved in refilling a spraying machine, the economies thus produced are extremely significant.

SPRAY DIRECTION

Figure 2:
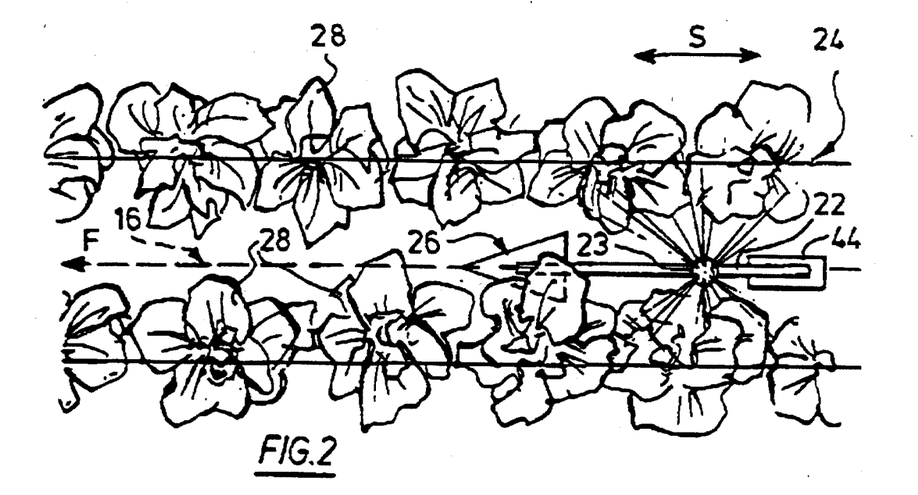

As indicated above, the disclosure in WO92/00670 is of upwardly or horizontally directed sprays from between the crop rows, with the principal spray directions being laterally outwardly from the generally central location between the rows. This is indicated in FIG. 2 of the drawings hereof.

It has been found that such an arrangement is more susceptible to variations in spraying effectiveness with respect to ground speed, than could be desired. Accordingly, improvements in this latter regard, or generally, are desirable, and an object of this aspect of the present invention is to provide one or more such improvements.

According to the invention there is provided a method and apparatus as claimed herein under the sub-heading "spray direction".

In a preferred embodiment, the direction of spraying from the droplegs is generally lengthwise of the crop rows, and rearwards with respect to the direction F of normal forward movement of the apparatus. In a variation, the spray direction is both rearwards and forwards.

By the provision of a lengthwise spraying direction with respect to the crop rows it has been found, surprisingly, that significant improvements in spraying performance are achieved.

ROW FOLLOWING

The carriage system of row following disclosed in WO92/00670 has been found to be effective in terms of its ability to accommodate row wander without the necessity for steering action by the driver of the tractor hauling the sprayer, but improvements have been shown to be desirable in relation to the actual row-following capabilities of the carriages, and an object of this aspect of the present invention is to provide improvements in this respect.

According to this aspect of the present invention there is provided a method and apparatus for crop spraying as defined in the relevant ones (identified as "row following") of the claims hereof.

Figures 3, 4, 5:
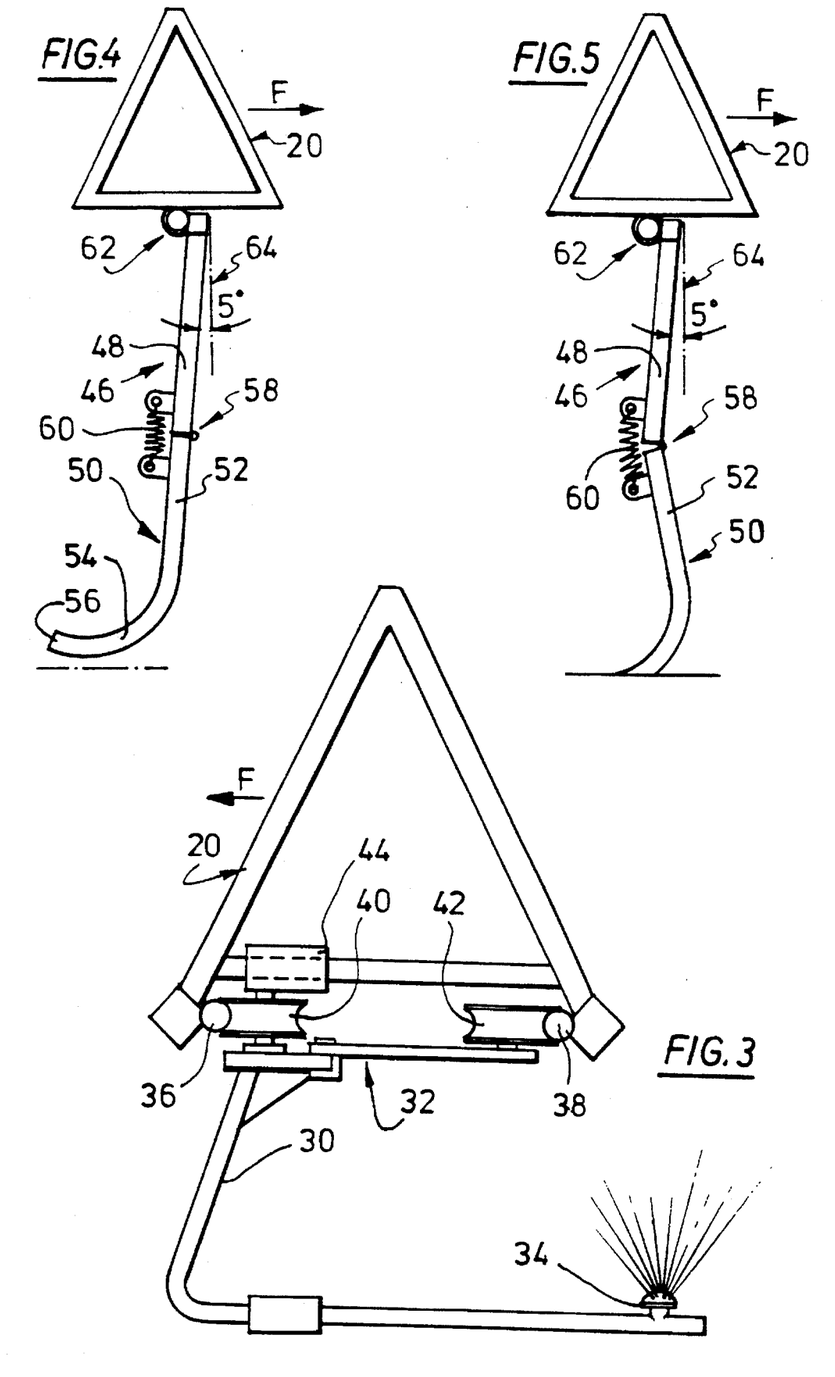

In a preferred embodiment, droplegs which effect crop spraying are mounted on carriages capable of moving lengthwise of the spray boom, and power operated means is provided to move the carriages lengthwise of the boom.

Control of the drive system for the carriages is provided by mechanical sensing means, such as the droplegs themselves, which are responsive to forces exerted thereon resulting from row wander, whereby a response signal is generated to effect powered carriage movement whereby the sensor or dropleg becomes centrally located with respect to the row. Response signals for this purpose may be generated by potentiometers connected to the droplegs. Power for the carriages may be provided by electric motors driving the carriages provided on the rail system extending lengthwise of the boom, as disclosed in WO92/00670.

BRIEF DESCRIPTION OF THE DRAWINGS

Embodiments of the invention will now be described by way of example with reference to the accompanying drawings in which:

FIG. 1 shows a plan view of a tractor and sprayer working in a row crop;

FIG. 2, shows, on a larger scale, an individual dropleg of the sprayer of FIG. 1 passing between two crop rows while it sprays;

FIG. 3 shows a side elevation view of a boom of the sprayer of FIG. 1, and with a dropleg shown below it;

FIGS. 4 and 5 show an alternative boom and dropleg configuration shown with the dropleg in its normal working configuration and a breakback configuration;

FIG. 6 shows a universal joint mounting for the droplegs of the preceding figures, indicating the axes of movement, potentiometers producing signals from such movement, and an associated control circuit;

FIG. 6A shows a wavy-washer cam and spring assembly for use in the joint assembly of FIG. 6;

FIG. 7 indicates the direction of dropleg movement for tilt and height sensing; and FIG. 8 shows a front elevation view of a dropleg mounted below the boom, and indicating the direction of pivotable movement for row-following functions;

FIG. 9 shows a rear elevation view of the inner ends of the two boom portions and an associated control and lift linkage;

FIG. 10 shows a part of the apparatus of FIG. 9 indicated diagrammatically; and FIGS. 11 and 12 show details of a modification of the assembly of FIGS. 9 and 10.

DESCRIPTION OF THE PREFERRED EMBODIMENT (s)

As shown in FIGS. 1 and 2, a tractor 10 is drawing spraying apparatus 12 to spray a potato crop 14 in which there are valleys 16 between successive ridges in the earthed-up row crop. The tractor runs with its wheels 18 in these valleys.

The spraying apparatus 12 comprises boom portions 20 and 21 extending laterally over the crop rows. Mounted on the boom portions are droplegs 22 having spray nozzles 23 in the region of their lower ends so as to effect a spraying action as indicated at 24 in FIGS. 1 and 2.

As shown in FIG. 2, a forwardly extending separator element 26 is provided in front of each of the droplegs 22 to divide a path through the leaves 28 of the potato crop, thereby enabling the dropleg to pass through the foliage without causing damage. The spray nozzle 23 which produces the spray 24 is positioned in the correct location on arm 22 to spray the undersides of foliage by means of a horizontally and/or vertically spray pattern as indicated at 24. For further details, reference is directed to WO92/00670.

In FIG. 3 there is shown an end elevation view of boom portion 20 with an alternative form of dropleg 30 mounted on a carriage 32 and having a spray nozzle 34, generally as disclosed in WO92/00670. Carriage 32 runs on tracks or rails 36, 38 by means of wheels 40, 42. The wheels are driven by an electric motor 44, for example a stepping motor. A cable drive may be provided from one directly driven wheel of the carriage to the other wheels.

FIGS. 4 and 5 show a breakback arrangement for the droplegs.

As shown in FIG. 4, a preferred form of dropleg 46 comprises a generally linear upper portion 48, and a lower portion 50 having a linear portion 52 and a rearwardly curved portion 54, which extends slightly upwards at its trailing end 56.

Intermediate the upper and lower portions 48, 50 of dropleg 46 is a hinge assembly 58 adapted to open in the direction shown in FIG. 5, and biased in the closing direction by a spring 60.

In FIGS. 4 and 5, the mounting of the upper end of dropleg 46 on boom portion 20 is through a carriage (not shown) generally in a manner similar to that seen in FIG. 3. This simplification has been adopted for reasons of economy of illustration.

There is shown in FIGS. 4 and 5 a universal joint 62 to be more fully described above in relation to FIGS. 6 to 8. Included in this latter mounting will be described a height and tilt sensing arrangement. There is shown at 64 in FIGS. 4 and 5 a sector of 5 degrees initial movement which occurs before a signal is generated for height and tilt sensing purposes.

Turning now to FIGS. 6, 6A, 7 and 8, FIG. 7 corresponds to FIG. 4, and shows the direction B—B of tilt and height sensing movement of dropleg 46. This angular movement B—B can also be seen in FIG. 6 in relation to the universal joint 62.

Figures 6, 6A:
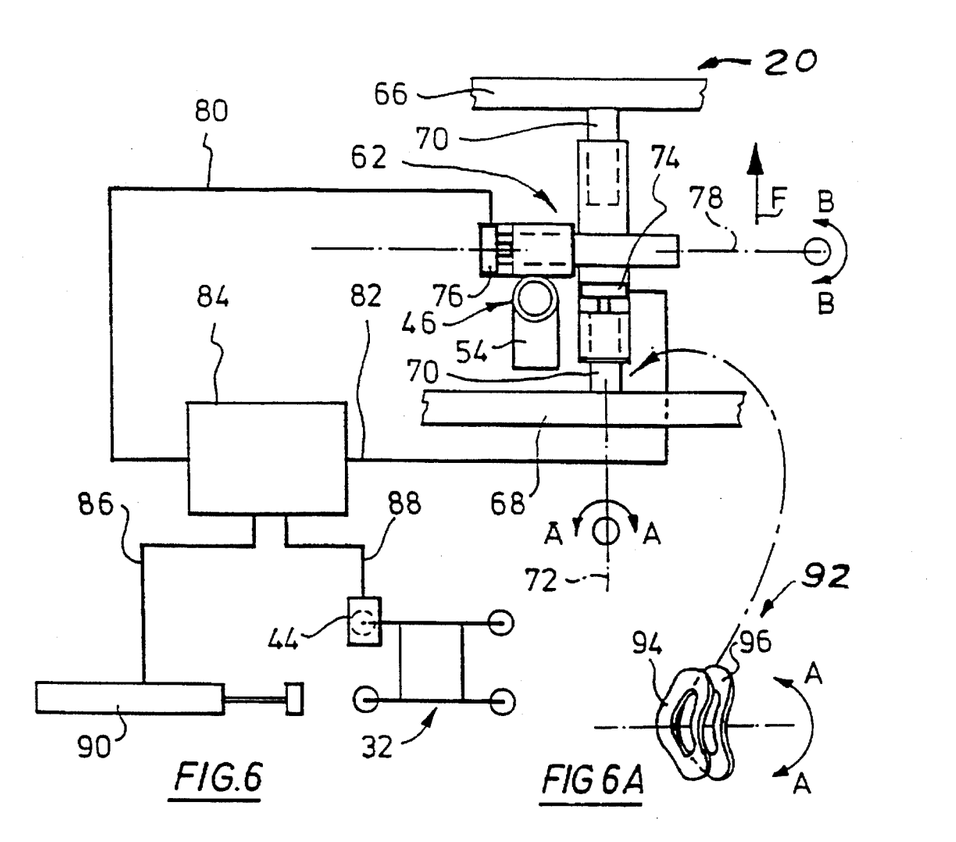
Figure 7:
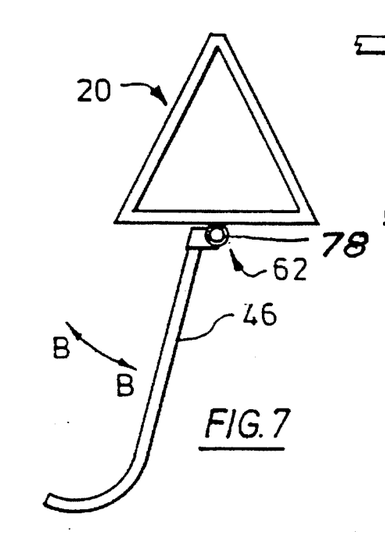

In FIG. 6, opposite sides of boom portion 20 are shown at 66 and 68. Cross-shaft 70 defines axis 72 for side-to-side row following angular movement of dropleg 46. A potentiometer 74 provides a signal proportional to the degree of row-following angular movement A—A. Likewise a potentiometer 76 provides a corresponding signal in relation to angular movement about axis 78 as a measure of tilt and height sensing in the direction B—B. These signals are fed by conductors, 80, 82 to a comparator/controller 84 which has output conductors 86, 88 controlling an electric ram 90 and carriage motor 44.

Figure 8:
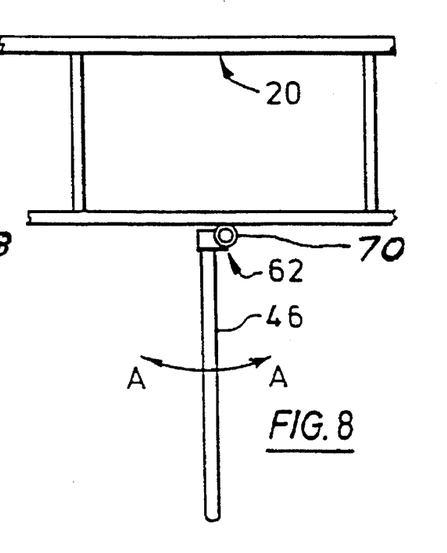
Figure 9:
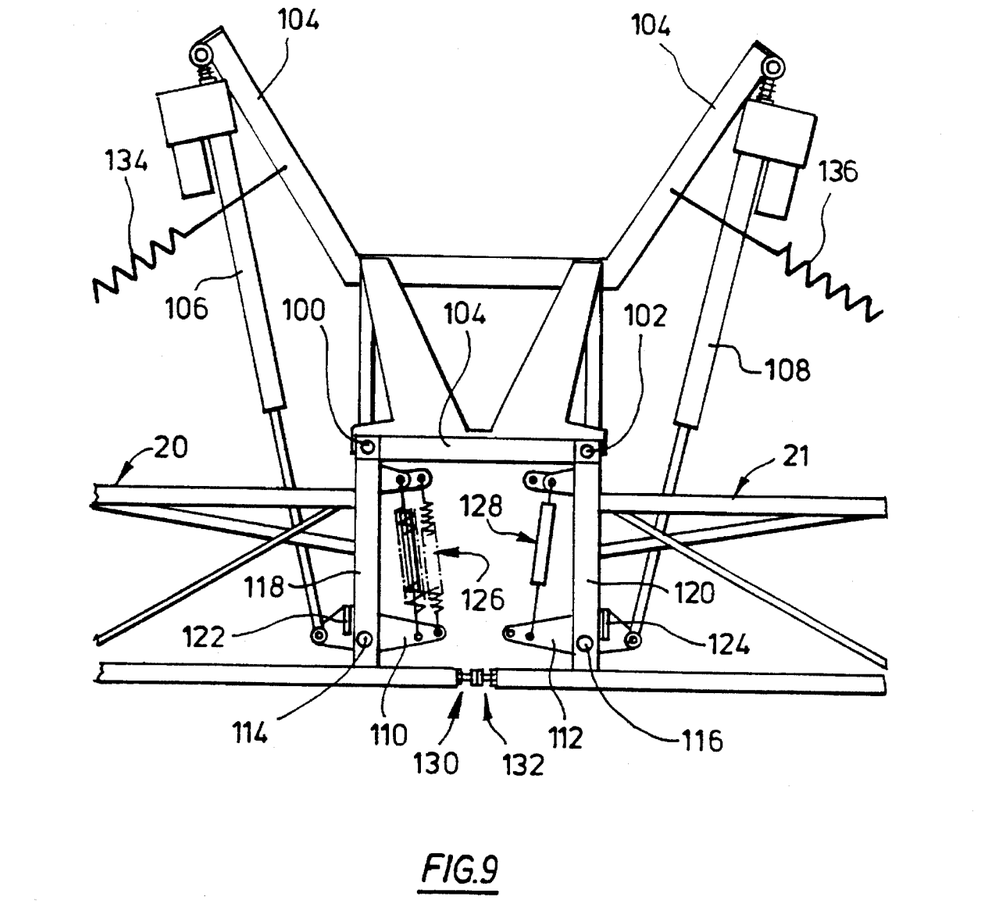
Figure 10:
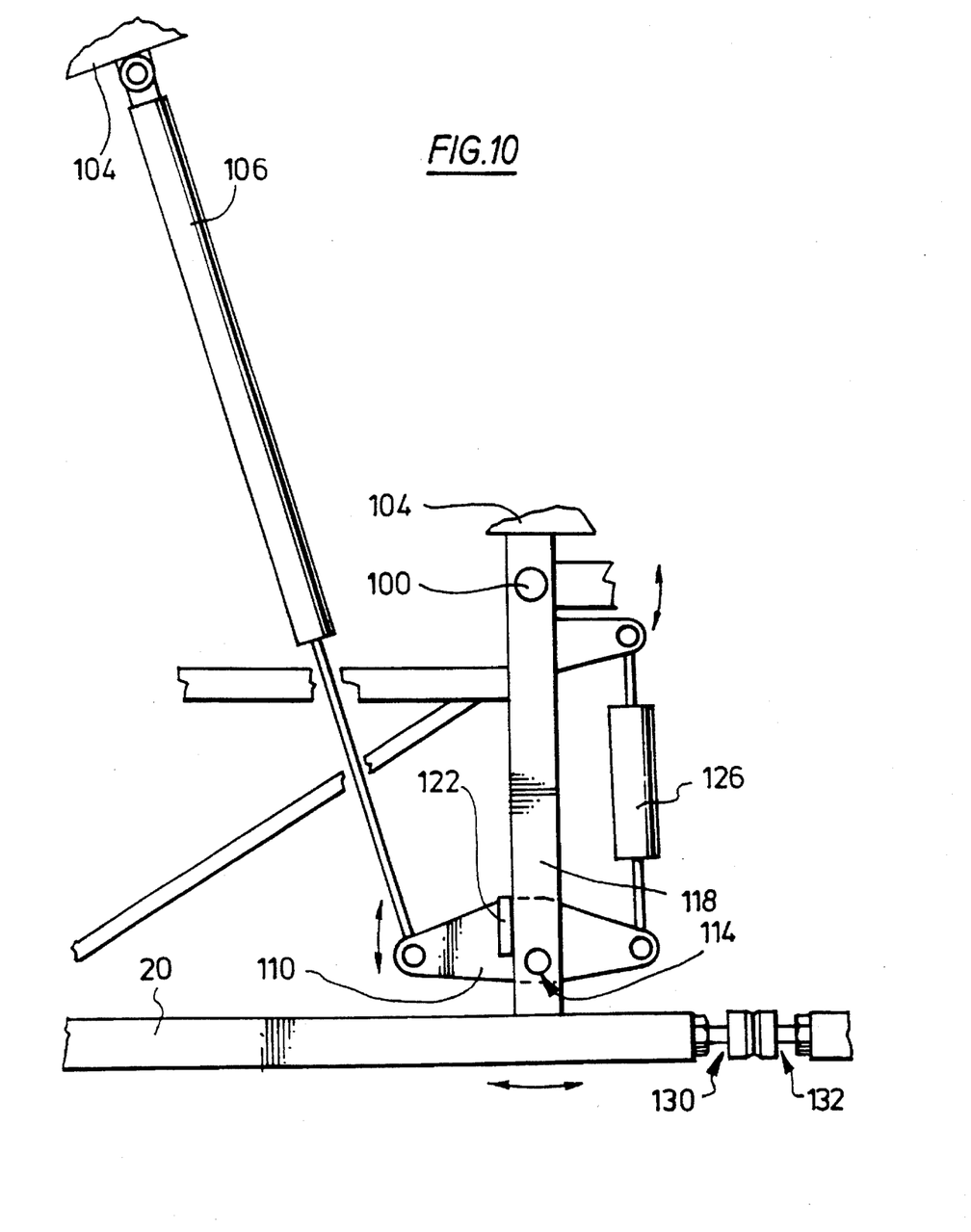
Figure 11:
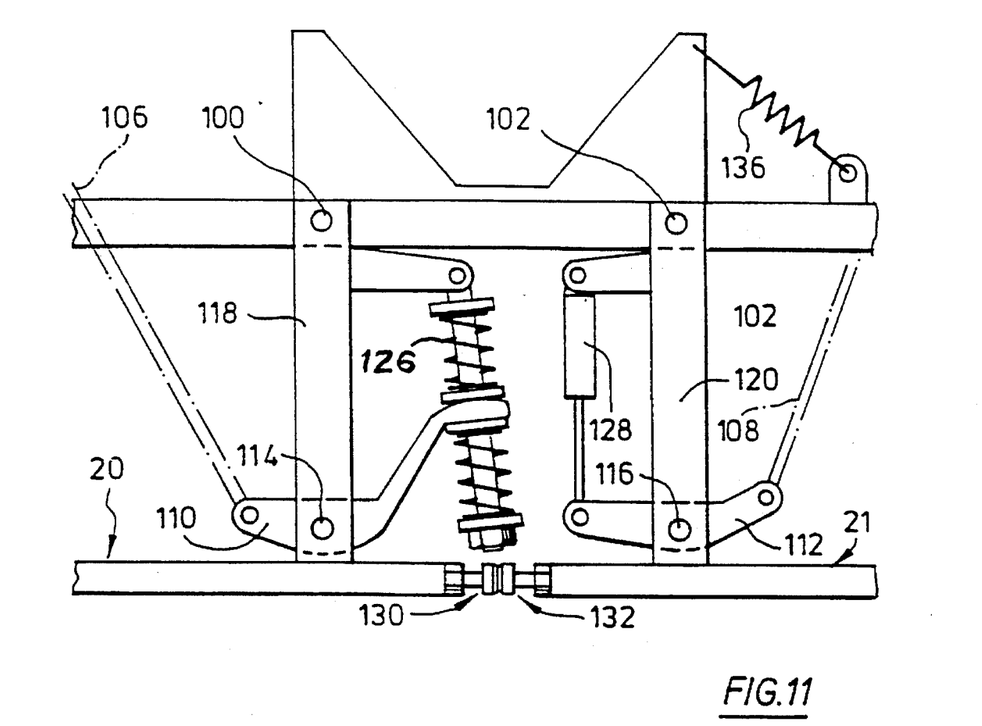
Figure 12:
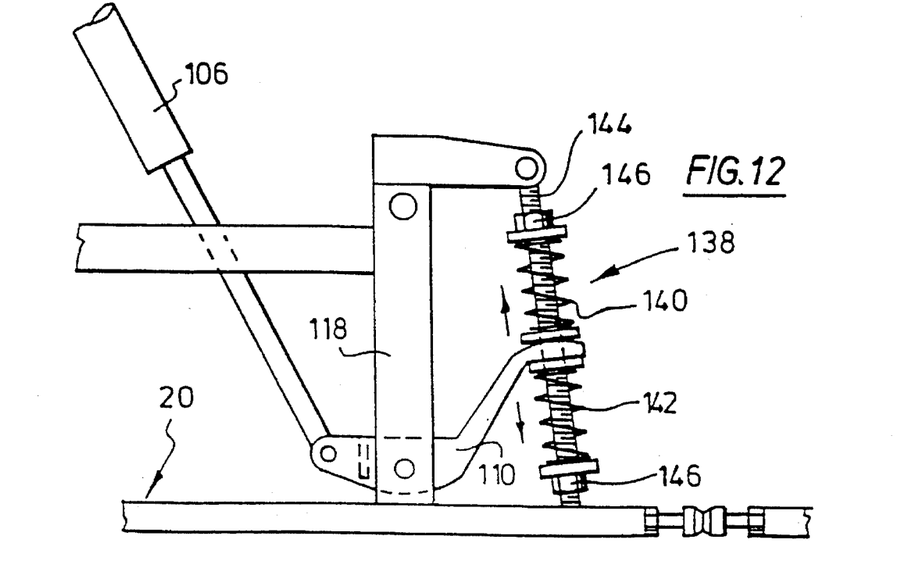

There is shown in FIG. 6A a cam assembly 92 comprising spring biased wavy washers 94, 96 to be mounted on cross-shaft 70 to a define a preferred position for dropleg 46 in the attitude shown in FIG. 8, but permitting lateral row-following movement in the direction A—A, and permitting also corresponding movement in the direction A—A when the boom 20 is folded for transport and the droplegs, under their own weight, pivot to a transport position. The central position of FIG. 8 is maintained as a preferred position by the spring-biased washers.

Height signals in the direction B—B enable controller 84 to actuate ram 90 accordingly, as will be more fully described below. Signals are in fact taken from two droplegs 46 at spaced positions on boom portions 20, 21, and the controller compares these to determine whether any lifting or lowering action is needed, and if so whether the boom requires equal movement at both ends, or a tilting action. If the former, then the entire boom is raised on a parallelogram linkage (not shown) extending between a headstock mounted on the draft links of tractor 10, and connected at its rear end to the boom portions 20, 21. If a tilting action is required, then ram 90 is actuated.

So far as row following is concerned, if dropleg 46 is not in proper alignment with a crop row, the thus, generated laterally-directed force causes angular movement in direction A—A of the dropleg, and this generates a signal to motor 44 on carriage 32 to move the carriage in the direction so as to restore dropleg 46 to its central position between the crop rows.

Figure 1:
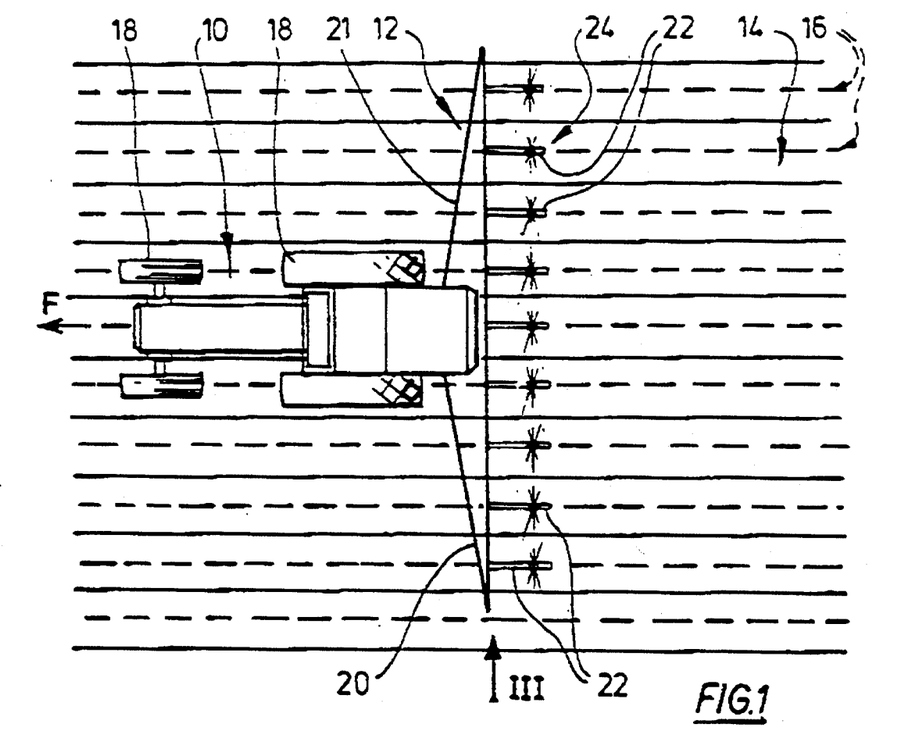

So far as spraying is concerned, the spray nozzles on the droplegs may spray in the generally lateral direction indicated at 24 in FIGS. 1 and 2. However, it is preferred to spray in the direction S seen in FIG. 2 ie in the fore/aft direction of normal forward motion F of the droplegs. This has been found to minimise the effect of forward travel speed on the efficacy of spraying. The fore/aft directed spraying is either effected in both fore and aft directions, or just in the aft or rearward direction.

Alternatively, spraying may be effected by means of a controlled droplet size generator (not shown) in which one or more rotary cones having grooves radiating from the apex of the cone are electrically driven to produce droplets significantly smaller than those produced by conventional spray nozzles such as shown at 23. The micro-droplets thus produced may be electrically charged so as to be attracted to the foliage of the crop material. The droplet generation may be effected within the tubular body of the dropleg, by means of two or more droplet-generating cones arranged in relatively close proximity. An air current generator may be mounted in association with the droplet, generating cones to enable an air current to energise the droplets as they are dispensed.

Turning now to the boom mounting and control systems shown in FIGS. 9 to 12, these are applicable to any kind of agricultural or horticultural boom type apparatus.

As shown in the drawings, boom portions 20, 21 are mounted on tractor 10 through respective main pivots 100, 102 having fore/aft axes. The pivots are mounted on a frame 104 located at the rearward end of the parallelogram linkage and constituting a portion thereof on which the entire boom assembly is mounted for vertical movement under tractor control. A pair of electrical actuators 106, 108 act between frame 104 and levers 110, 112 pivotally mounted at 114, 116, respectively, on the inner ends 118, 120 of boom portions 20 and 21 respectively.

Levers 110 and 112 have stop plates 122, 124 to contact the ends 118, 120 after a predetermined amount of lost motion.

Acting between the inner ends of levers 110, 112 and frame 104 are a spring assembly 126 and a hydraulic damper 128.

Boom portions 20, 21 have projecting abutment means 130, 132 which make face-to-face engagement and frictional contact, as shown in FIG. 9.

Spring assembly 126 is a combined tension and compression spring assembly with an associated damper, whereby both clockwise and anticlockwise moments are applied to lever 110 are resiliently resisted, and rapid movements of the lever are damped. It is to be noted that the right hand boom 21 has only an hydraulic damper 128 to damp movement of lever 112.

The weight of boom portions 20 and 21 is partially offset by tension springs 134 and 136.

In the embodiments of FIGS. 11 and 12, parts corresponding to those of FIGS. 9 and 10 are given the same reference numerals. In this embodiment, the spring assembly 126 is in the form of a twin coil spring assembly 138 with lever 110 connected between springs 140, 142, and these springs being adjustably mounted on a threaded lengthwise rod 144, and nuts 146 being provided to adjust spring loading.

Operation will now be described.

Boom portions 20 and 21 are raised for transport by energising actuators 106, 108 in the retraction direction. Stop plates 122, 124 engage ends 118, 120 of the boom portions and direct lift occurs about pivots 100, 102, for transport purposes. On recommencing work, actuators 106 and 108 are re-extended until the stop plates 122, 124 are clear of the boom end 118, 120.

Then, before commencing spraying, the boom is levelled with respect to the ground by extending or retracting actuator 106. Such thrust is transmitted to the boom portion 20 by virtue of the spring assembly 126, causing the boom portion to tilt. This adjustment is carried out manually until the required levelling has been achieved. A corresponding movement is transmitted through abutment means 130, 132 to boom portion 21, which is likewise levelled.

Spraying can then commence. Signals from the height-sensing droplegs are communicated to controller 84 and ram 90 (corresponding to ram 106) is energised accordingly to maintain constant boom height and attitude. Carriage 32 is moved as necessary by motor 44 to maintain the droplegs centrally between the crop rows. If the signals from the two sensing droplegs indicate that an overall increase or reduction of boom height, this is effected by raising or lowering the main parallelogram linkage.

During spraying, tractor movements, particularly rapid ones caused by the terrain are not permitted to affect the pre-set constant height and attitude of the boom 20, 21. This latter is maintained by the movement absorbtion characteristics of the spring assembly 126 and the damping effect of abutments 130, 132 and the hydraulic damper 128.

Amongst other modifications which could be made in the above embodiments while remaining within the scope of the invention, are the following:

1. The use of a paddle element on the droplegs to enable same to sense height from the top of a crop to be sprayed.
2. The use of telescopic droplegs to accommodate differing crop heights.
3. The mounting of the controlled-size droplet generation apparatus within the tubular structure of the droplegs.
4. The reduction in tank size for the spraying liquid where controlled droplet size apparatus is used. The overall volume of liquid required may be as low as 1/20 of that normally required.
5. The use of one or more droplegs per drivable carriage on the boom.
6. The use of the boom mounting and actuation linkage for automotive suspension duties.
7. The use of dropleg articulation and carriage drive and cam-location in non height-and-tilt sensing droplegs.

While the best modes for carrying out the invention have been described in detail, those familiar with the art to which this invention relates will recognize alternative designs and embodiments for practicing the invention. Thus, the above described preferred embodiment is intended to be illustrative of the invention which may be modified within the scope of the following appended claims.

I claim

1. A method of controlling the height from the ground of agricultural and horticultural implements having a boom, the boom being a spraying boom having at least a pair of opposed boom portions (20, 21), each boom portion having plurality of droplegs (22, 30, 46) mounted thereon in spaced relation along the length of the boom to effect spraying between drop row crap rows, each dropleg having spraying means (34) mounted thereon, the method comprising:

a) employing height sensing means at at least one location on said boom;
   b) activating said height sensing means to generate height signals;
   c) using said height signals to control the height of the boom at said at least one location;
   d) said height sensing means comprising a sensor mounted on the boom and directly contacting the soil surface;
   e) employing said sensor in the form of at least one of said droplegs mounted on said boom to depend therefrom and to engage the ground, and providing signalling means (74, 76) connected to said at least one dropleg;
   f) mounting said at least one dropleg on said boom for up and down movement of its lower end by angular movement about an axis extending generally lengthwise of the boom; and
   g) activating said signalling means (74, 76) to generate boom height control signals upon said angular movement of said at least one dropleg;
   h) employing tilting actuating means (90, 104, 106) for receiving said boom height control signals and adjusting the height of the boom in response to the magnitude of said control signals.

2. An agricultural or horticultural boom-type implement comprising:

a) a boom (12) adapted to extend transversely over multiple rows of crops;
   b) height sensing means (12, 30, 46) at at least one location on said boom (20, 21) for generating height signals indicating the height of the boom relative to ground at said at least one location and to control the height of the boom at said at least one location;
   c) said height sensing means comprising a sensor (22, 30, 46) mounted on the boom (20, 21) to contact the soil surface;
   d) said sensor being in the form of a dropleg mounted on said boom to depend therefrom and to engage the ground;
   e) said sensor dropleg being rotationally mounted on said boom for up and down movement of its lower end by angular movement about an axis extending generally lengthwise of the boom;
   f) signalling means (74, 76) connected to said sensor dropleg for generating boom height control signals upon said angular movement of said sensor dropleg;
   g) tilting actuating means (90, 106) operationally connected to said boom to control boom height in response to said height control signals; and
   said boom (12) being a spraying boom having at least a pair of opposed boom portions (20, 21), each said boom portion having a plurality of droplegs (22, 30, 46) mounted thereon in spaced relation along the length of the boom to effect spraying between from rows, and each said dropleg having spraying means (34) mounted thereon.

3. Apparatus according to claim 2 characterized by said height sensing means including a sensor dropleg (22, 30, 46) mounted on each said boom portion, and signalling means (74, 76) to sense boom height at each said sensor dropleg, and comparator means (84) being operative to signal to actuate a boom tilt mechanism (106) upon detecting a height difference between the boom portions at each said sensor dropleg.

4. Apparatus according to claim 2 characterized by said sensor dropleg (46) being mounted on said boom (12) for lateral turning movement about a generally fore/aft axis (A—A) in response to non-alignment of said sensor dropleg (46) with the central region between successive crop rows in use, and said signalling means (74) being connected to said dropleg to signal such turning movement to enable responsive action to be taken.

5. Apparatus according to claim 4 further characterized by power driven carriage means (32) being mounted on said boom for movement lengthwise of said boom (20, 21), said sensor dropleg (46) being mounted on said carriage means and said turning movement signal being arranged to cause actuation of said carriage means (32) in a direction to centralize said sensor dropleg with respect to said crop row.

6. Apparatus according to claim 4 further including cam means (94, 96) operatively connected to said sensor dropleg (46) to permit said turning movement (A—A) about said generally fore/aft axis for row following and movement to a transport position, on each side of a preferred central position.

7. Apparatus according to claim 2 characterized by each of said plurality of droplegs including said sensor dropleg (46) being articulated between their end to permit breakback on reversing movement of the boom (20, 21) with respect to the ground.

8. An agricultural or horticultural boom type implement comprising:
   a) two boom portions (20, 21);
   b) pivot means (100,102) to permit up and down movement of said boom portions;
   c) separable opposing abutment members (130, 132) at a respective inner end of each of said boom portions whereby said boom portions make direct abutting engagement, and the location of said abutment members being such that said up and down movement of one of said boom portions about its pivot means causes transmission of corresponding movement through the abutment members to the other of said boom portions.

9. An implement according to claim 8 characterized by said pivot means (100, 102) being located in a raised position with respect to said abutment members (130, 132) and offset laterally outwardly thereof.

10. An implement according to claim 8 characterized by said pivot means comprising the main hinges for said boom portions and having hinge axes extending generally in the fore/aft direction (F).

11. An implement according to claim 8 characterized by a single actuator (106) acting directly on one said boom portion (20) to tilt the boom portion about said hinge axis and said actuator being effective to tilt the other boom portion (21) by virtue of said transmitted motion.

12. An agricultural or horticultural boom-type implement comprising:
   a) boom means (20, 21);
   b) a lift mechanism (106, 110, 122) for said boom means;
   c) said lift mechanism being connected to said boom means through lost motion means (122);
   d) the arrangement being such that on taking up said lost motion, said lift mechanism can lift said boom means, and when said lost motion is not taken up, said lift mechanism can act on said boom means to control the attitude thereof.

* * * * *

UNITED STATES PATENT AND TRADEMARK OFFICE
CERTIFICATE OF CORRECTION

PATENT NO. : 5,507,435
DATED : April 16, 1996
INVENTOR(S) : Roger S. Benest

It is certified that error appears in the above-identified patent and that said Letters Patent is hereby corrected as shown below:

Column 1, Line 8

"sparaying" should be --spraying--;

Column 2, Line 52
"operates" should be --operation--;

Column 11, Line 50, Claim 1 delete "drop row crap" and insert --crop--;

Column 12, Line 40, Claim 2

"from" should be --crop--;

Signed and Sealed this

Fifth Day of November, 1996

Attest:

BRUCE LEHMAN

Attesting Officer

Commissioner of Patents and Trademarks

UNITED STATES PATENT AND TRADEMARK OFFICE
CERTIFICATE OF CORRECTION

PATENT NO. : 5,507,435
DATED     : April 16, 1996
INVENTOR(S) : Roger S. Benest

It is certified that error appears in the above-indentified patent and that said Letters Patent is hereby corrected as shown below:

On the title page, item [22] , at the PCT filing date item [22], change "July 23, 1994" to --July 23, 1992--;

Signed and Sealed this

Twenty-fifth Day of March, 1997

Attest:

BRUCE LEHMAN

Attesting Officer

Commissioner of Patents and Trademarks